United States Patent [19]
Kaelin

[11] 3,875,057
[45] Apr. 1, 1975

[54] TANK CLARIFICATION PLANT

[76] Inventor: Joseph Richard Kaelin, Villa Seeburg, CH-6374, Bouchs, Switzerland

[22] Filed: Nov. 21, 1972

[21] Appl. No.: 308,598

[30] Foreign Application Priority Data
Nov. 22, 1971 Switzerland............. 17044/71

[52] U.S. Cl.............. 210/104, 210/173, 210/194, 210/220, 241/46.17, 261/93

[51] Int. Cl............. B01f 3/04, C02c 5/06

[58] Field of Search............ 210/4, 5, 7, 14, 96, 152, 210/173, 194, 195, 197, 218–221, 86, 104, 105; 241/46 R, 46.06, 46.17, 220; 261/93; 55/173

[56] References Cited
UNITED STATES PATENTS

| | | |
|---|---|---|
| 1,215,817 | 2/1917 | Kimmerling .............. 210/173 |
| 2,882,994 | 4/1959 | Lovelady et al. .............. 55/173 |
| 2,944,802 | 7/1960 | Daman.............. 261/93 X |
| 3,025,962 | 3/1962 | Williams.............. 210/86 |
| 3,318,248 | 5/1967 | Rembold.............. 241/46.17 X |
| 3,342,727 | 9/1967 | Bringle.............. 210/220 X |
| 3,480,213 | 11/1969 | Shelton, Jr. .............. 241/46 R X |
| 3,547,357 | 12/1970 | Johnson.............. 241/46.17 X |
| 3,574,331 | 4/1971 | Kurosawa et al. .............. 210/219 X |
| 3,679,053 | 7/1972 | Koulovatos et al. .............. 210/220 X |

*Primary Examiner*—John Adee
*Assistant Examiner*—Robert H. Spitzer
*Attorney, Agent, or Firm*—Oblon, Fisher, Spivak, McClelland & Maier

[57] ABSTRACT

A tank clarification plant is provided with a liquid circulation apparatus housed in the lower part of the tank. Blades of the liquid circulation apparatus cooperate with stationary cutting blades to avoid the apparatus becoming clogged by hairs, etc.

12 Claims, 5 Drawing Figures

TANK CLARIFICATION PLANT

The present invention relates to a tank clarification plant.

Tank clarification plants are already known but they suffer from the disadvantage that the ventilation unit is at the level of the water level. The great disadvantage of this is that the ventilation unit must be vertically adjustable in the inside of the tank, as the liquid level always changes its height to a fairly large extent in such plants during operation. To this end the ventilation unit is housed so as to float in many cases, but this is very expensive and complicated.

The invention aims to provide a tank clarification unit which does not have these disadvantages.

According to the invention there is provided a tank clarification plant provided with at least one stationary cutting blade and a liquid circulation apparatus which has blade-shaped faces and is housed in the lower zone of the tank the blade-shaped faces co-operating with said at least one stationary cutting blade in order to achieve a shearing effect, at least one inlet conduit discharging into the suction zone of the liquid circulation unit in order to supply oxygen or an oxygen mixture into the liquid which is to be clarified, control means being provided in order to so control the level of liquid that it is always above the liquid circulation unit.

It is expedient that the blade-shaped faces are provided at the leading edges with cutting blades located in a plane running perpendicular to the axis of rotation of the body of the rotor.

In order to ensure shearing of fibrous foreign bodies such as for example hairs or nylon threads it is of advantage if the co-operating cutting edges of the cutting blades are so shaped that the shearing angle increases and decreases several times during the cutting process along the cutting edges. It is expedient in this case if at least the cutting edge of the stationary cutting blade has a zig-zag or corrugated shape.

In order to introduce oxygen or an oxygen mixture into the liquid which is to be clarified it is of advantage if the inlet conduit for the supply of oxygen or an oxygen mixture into the liquid which is to be clarified is dimensioned in such a way and discharges at such a point in the suction zone of the liquid circulation unit that the underpressure produced by the latter at the mouth of the leading conduit is sufficient at least when the liquid level is low to automatically suck in oxygen or an oxygen mixture through the inlet conduit discharging at the other end above the level of the liquid, and in that switching means are provided to guide oxygen or an oxygen mixture into the inlet conduit under pressure when the liquid level is higher.

The invention is further described in the following by way of example with the help of the drawing, in which.

Figure 1:
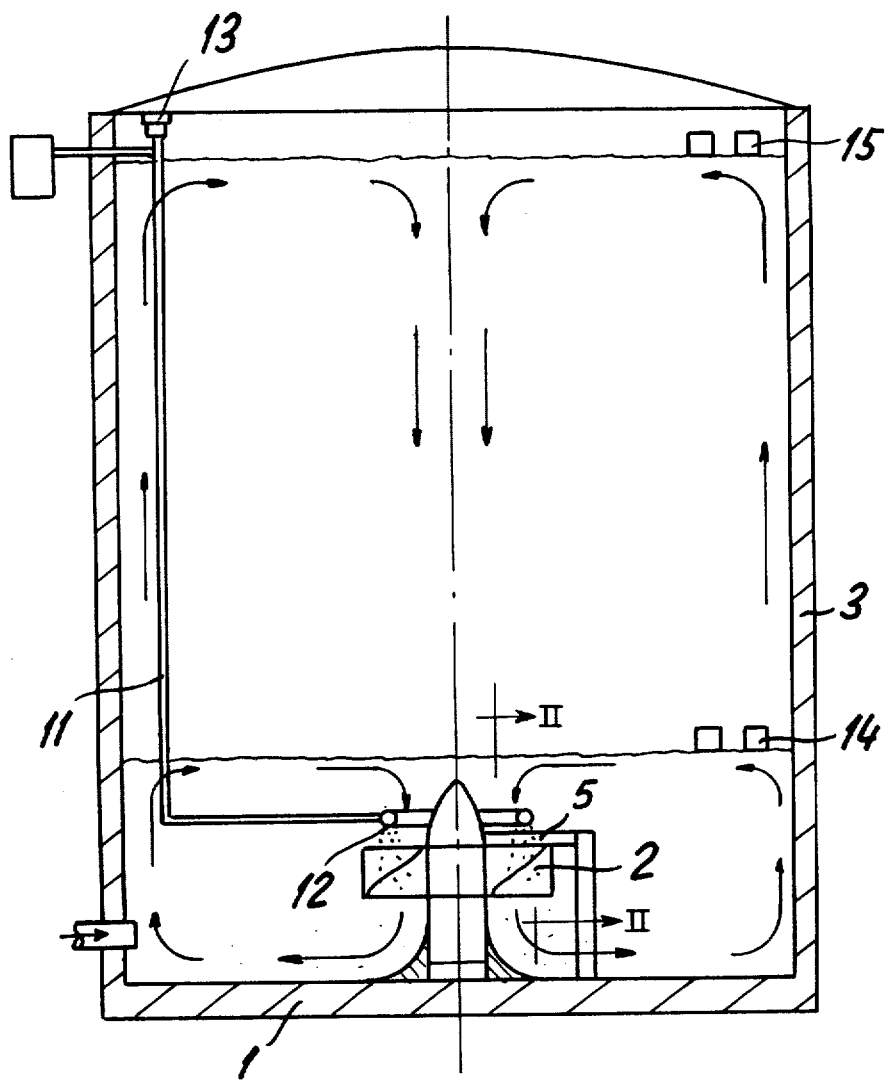
FIG. 1 is a cross-section through an embodiment of a tank clarification unit according to the invention.

As can be seen from FIG. 1, the tank clarification unit which is illustrated is provided with a liquid circulation unit 2 which has blade-shaped faces and is housed directly above the base of the tank 1. When the liquid circulation unit 2 is housed in the lower part of the tank 3 and beneath the liquid level the danger of blockage in the latter is very great, and thus the leading edges of the blade-shaped faces of the liquid circulation unit 2, which are provided with cutting blades 4, co-operate with one or more stationary cutting blades 5 in order to achieve a shearing effect.

Figure 5:
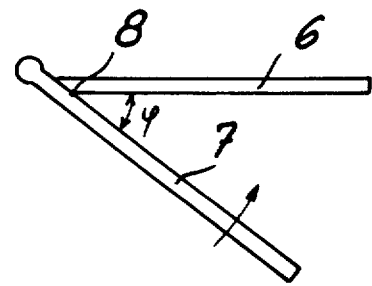
FIG. 5 is a representation intended to explain the cutting angle.

In order to achieve trouble-free shearing of fibrous foreign bodies such as for example hairs or nylon threads the co-operating cutting edges of the cutting blades 4 and 5 are so shaped that the shearing angle $\psi$ increases and decreases several times during the cutting process along the cutting edges. As can be seen from FIG. 5 with the help of two cutting blades 6 and 7 with straight cutting edges, the shearing angle $\psi$ is the angle between the two co-operating cutting edges, at the intersection 8. By reducing the cutting angle $\psi$ at several points along the cutting edge the tendency for the material which is to be sheared towards radial outward displacement while still uncut may be reduced to a marked degree or even completely avoided, depending upon the reduction in the cutting angle.

Figure 2:
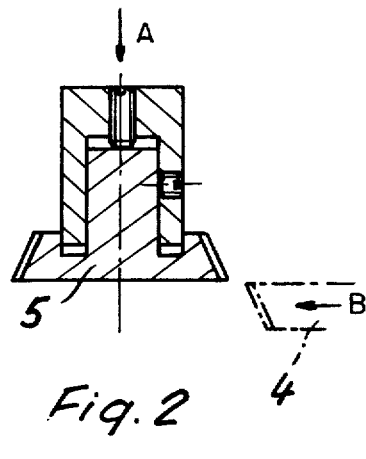
FIG. 2 is a section, on an enlarged scale, along the line II—II of FIG. 1 through the stationary cutting blade.

For reasons of cost, it is of advantage if the numerous rotating cutting blades 4 are provided with only straight cutting edges. In order to achieve a particularly good shearing effect the stationary cutting blade 5 which is used in the clarification plant according to FIG. 1 is designed in the way shown in FIGS. 2 and 3. The corrugated design of the cutting edge 9 of the stationary cutting blade 5 results in suspended threads rotating around the cutting blades 4 in the direction of the arrow B being as it were encircled by the corrugated parts of the cutting edge 9 and thus no longer able to escape during the shearing process.

Figure 3:
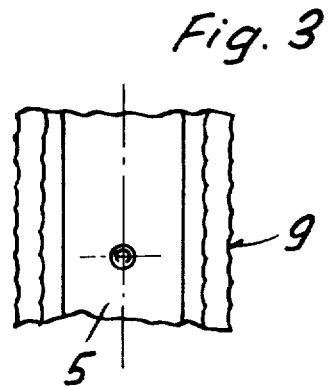
FIG. 3 is a view along the direction of the arrow A in FIG. 2.
Figure 4:
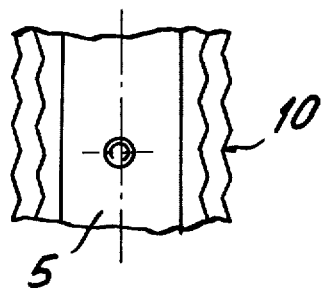
FIG. 4 is an analogous view to that in FIG. 3 to show another cutting edge configuration.

FIG. 4 shows a similar view to that in FIG. 3 and illustrates another cutting edge configuration, the cutting edge 10 having a zig-zag shape.

An inlet conduit 11 which discharges into the suction zone of the liquid circulation unit 2 is provided for the supply of oxygen or an oxygen mixture into the liquid which is to be clarified. This inlet conduit 11 is so dimensioned and discharges at such a point in the suction zone of the liquid circulation unit 2, that the underpressure produced by means of the latter at the mouth 12 of the lead-in conduit is sufficient, in the case where there is a low liquid level, in other words when there is low water pressure in the zone of the mouth 12 of the lead-in conduit, to automatically suck in oxygen or an oxygen mixture such as for example air through the lead-in conduit 11 discharging at the other end 13 above the liquid level. If the amount of oxygen sucked in is no longer sufficient when the liquid level rises, the inlet aperture 13 of lead-in conduit 11 is automatically closed and air or even pure oxygen is guided into the lead-in conduit 11 by means of a compressor. This switch may be controlled for example by means of photocells which scan the liquid level.

As the water level changes its height to a fairly large extent in a tank clarification unit, photocells 15 and 14 are provided in the inside of the tank in order to control the highest and lowest liquid levels.

As the liquid circulation unit 2 is housed directly above the base of the tank 1, it is possible to use even very deep tanks, as it is possible by this means to obtain a sufficient flow speed above the space of the tank 1 to avoid deposits of sludge on the base of the tank 1.

The tank 3 may be for example cylindrical, cuboid or spherical in shape.

What is claimed is:

1. A tank clarification plant, particularly for large-scale irregular sewage influx, in which septic and clarification tanks are represented in succession by a common chamber and the maximum and minimum levels vary between relatively wide limits, comprising:

a tank;

a liquid circulation member disposed adjacent the lower region of said tank substantially in the central area thereof and having a plurality of impeller blades for causing liquid in said tank to circulate in a direction from above said impeller blades, through and between said impeller blades, to the outer peripheral regions of said tank of and to the upper level of the liquid in said tank;

at least one stationary cutting blade disposed immediately adjacent said liquid circulation member and having leading edges contiguously cooperable with said impeller blades of said liquid circulation member for producing a shearing effect therebetween;

a conduit in said tank open at one end to the exterior of said tank and at the other end immediately above said liquid circulation member for introducing an oxygen-containing gas mixture to the immediate vicinity of the inlet side of said liquid circulation member for being circulated and moved with said liquid through said impeller blades; and means for controlling the level of said liquid in said tank for insuring that said level of said liquid is always above said liquid circulaton member.

2. A clarification tank according to claim 1, wherein said impeller blades of said liquid circulation member are provided at the leading edges thereof with cutting surfaces which lie in a plane perpendicular to the axis of rotation of said liquid circulation member.

3. A clarification plant according to claim 1 wherein the cooperating cutting edges of said at least one cutting blade and said impeller blades are so shaped that the shearing angle observed in a horizontal plane increases and decreases several times during the cutting process as the shearing point moves along the cutting edges.

4. A clarification plant according to claim 3, wherein the cutting edge of at least the stationary cutting blade observed in a horizontal plane has a zig-zag shape.

5. A clarification plant according to claim 3, wherein the cutting edge of the stationary cutting blade observed in a horizontal plane has a corrugated shape.

6. A clarification plant according to claim 1, wherein said conduit in said tank for introducing an oxygen-containing gas mixture into the liquid to be clarified is so dimensioned and discharges at such points in the intake region of said liquid circulation member that the underpressure produced by the latter operates at least when the liquid level is low to suck in said oxygen-containing mixture through said conduit from said one end thereof open to the exterior of said tank, said open one end thereof being disposed above the surface of said liquid in said tank, and further comprising switching means for supplying said oxygen-containing mixture under pressure when said liquid in said tank is at a higher level.

7. A clarification plant according to claim 6, further comprising a compressor connected to said conduit through said switching means.

8. A clarification plant according to claim 1, wherein said control means comprises photocells housed in the inside of the tank in order to control the highest and lowest liquid levels.

9. A clarification plant according to claim 1, wherein the tank is covered at its top side by a dome.

10. A clarification plant according to claim 1, wherein the liquid circulation unit is housed directly above the base of the tank and that its longitudinal axis coincides with the central axis of the tank.

11. A clarification plant according to claim 1, wherein the tank is cylindrical in shape.

12. A clarification plant according to claim 1, wherein the tank is cuboid in shape.

* * * * *